(12) United States Patent
Salah et al.

(10) Patent No.: US 12,044,328 B2
(45) Date of Patent: Jul. 23, 2024

(54) HYDRAULIC VALVE MODULE FOR SAFE DEACTIVATION IN THE CASE OF FAILURE OF AN EXTERNAL CURRENT SUPPLY, AND METHOD FOR OPERATING A HYDRAULIC VALVE

(71) Applicant: Bucher Hydraulics GmbH, Klettgau (DE)

(72) Inventors: Gerd Salah, Hennef (DE); Steffen Hartmann, Wutöschingen (DE)

(73) Assignee: Bucher Hydraulics GmbH, Klettgau (DE)

( * ) Notice: Subject to any disclaimer, the term of this patent is extended or adjusted under 35 U.S.C. 154(b) by 65 days.

(21) Appl. No.: 17/910,954

(22) PCT Filed: Mar. 2, 2021

(86) PCT No.: PCT/EP2021/055101

§ 371 (c)(1),
(2) Date: Sep. 12, 2022

(87) PCT Pub. No.: WO2021/180508

PCT Pub. Date: Sep. 16, 2021

(65) Prior Publication Data

US 2023/0167918 A1  Jun. 1, 2023

(30) Foreign Application Priority Data

Mar. 13, 2020 (DE) ...................... 10 2020 107 032.2

(51) Int. Cl.
*F16K 31/04* (2006.01)
*F15B 13/10* (2006.01)

(52) U.S. Cl.
CPC ............ *F16K 31/046* (2013.01); *F15B 13/10* (2013.01)

(58) Field of Classification Search
CPC ................. F15B 13/0846; F15B 13/10; F15B 2211/8623; F15B 2211/8752; F15B 13/0402; F15B 20/002; F16K 31/046
See application file for complete search history.

(56) References Cited

U.S. PATENT DOCUMENTS

| | | | |
|---|---|---|---|
| 5,278,454 A * | 1/1994 | Strauss | H02J 9/061 307/64 |
| 6,186,471 B1 | 2/2001 | Genga et al. | |

(Continued)

FOREIGN PATENT DOCUMENTS

| | | |
|---|---|---|
| DE | 3840125 A1 | 5/1990 |
| DE | 69327787 T2 | 8/2000 |

(Continued)

OTHER PUBLICATIONS

Machine Translation DE102018202258A1 retrieved from espacenet.com Jan. 10, 2024. (Year: 2024).*

Primary Examiner — Jessica Cahill
(74) Attorney, Agent, or Firm — BainwoodHuang

(57) ABSTRACT

Techniques involve a hydraulic valve module having at least one hydraulic valve with a valve slide which can be adjusted by way of an electric actuator in order to supply hydraulic lines with hydraulic liquid by way of the hydraulic valve. The hydraulic valve module has a controller and an electric energy store. The controller and the electric energy store are set up to move the valve slide out of every possible valve slide position into a deactivation position by way of the electric actuator and energy which is stored in the electric energy store. This allows the safe operation of hydraulic valves without a restoring spring, wherein valves of this type and the actuators thereof can be of smaller and less expensive construction than in the case of conventional valves with a restoring spring.

15 Claims, 7 Drawing Sheets

(56) References Cited

U.S. PATENT DOCUMENTS

Figure 1A:
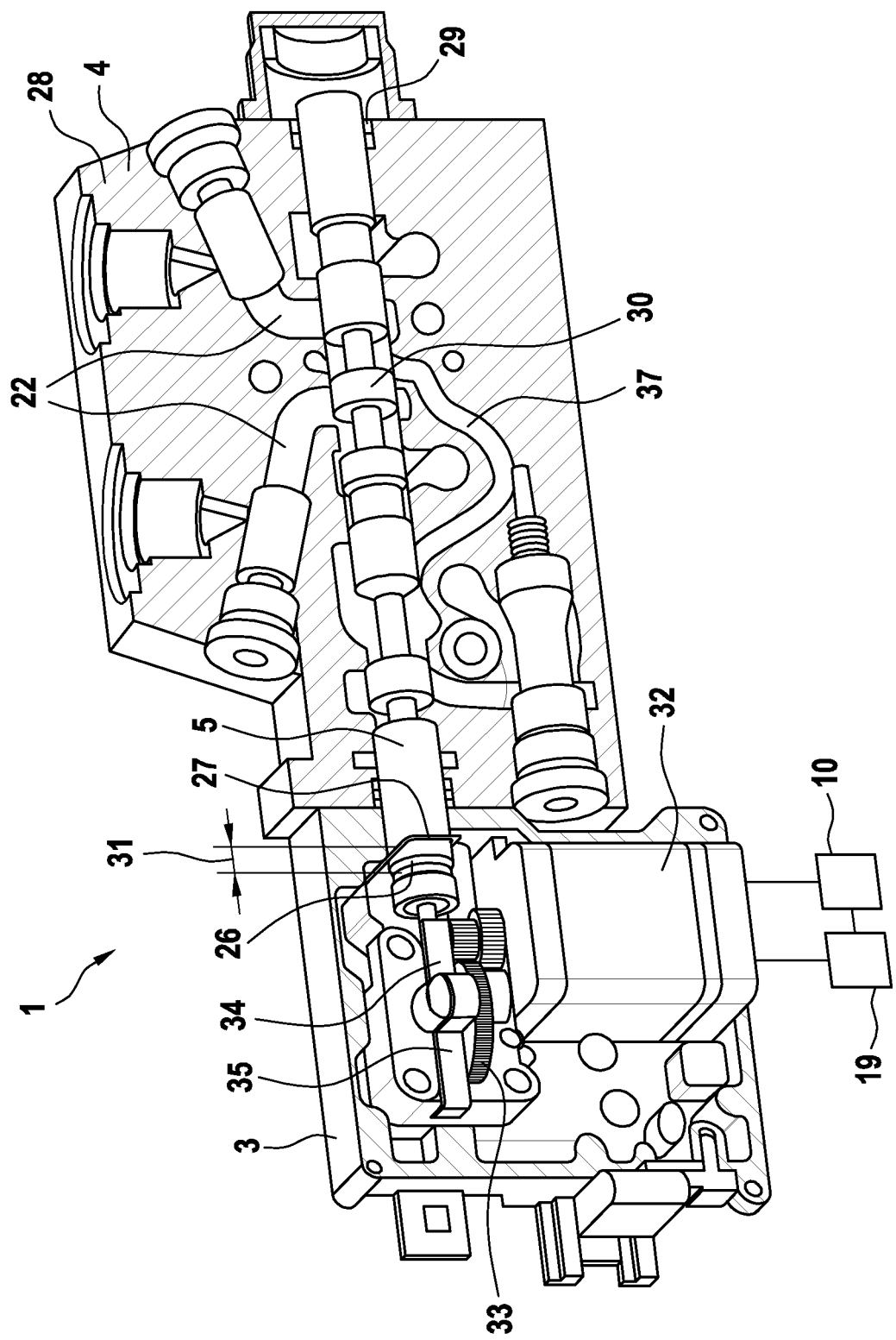

| | | | | |
|---|---|---|---|---|
| 6,234,199 B1 * | 5/2001 | Nohira | .................. | F16K 27/003 |
| | | | | 137/557 |
| 6,257,549 B1 * | 7/2001 | Hopper | ..................... | H02J 9/06 |
| | | | | 251/129.11 |
| 6,397,880 B1 * | 6/2002 | Stoll | ................... | F15B 13/0857 |
| | | | | 137/271 |
| 2008/0121830 A1 * | 5/2008 | Martin | ................ | F15B 13/0839 |
| | | | | 251/129.11 |
| 2015/0323908 A1 * | 11/2015 | Rondot | .................... | G05B 1/03 |
| | | | | 251/129.05 |
| 2018/0135659 A1 * | 5/2018 | Kitahara | ................. | F15B 11/10 |
| 2019/0063632 A1 * | 2/2019 | Schwobe | ................ | A62C 37/50 |

FOREIGN PATENT DOCUMENTS

| | | | | |
|---|---|---|---|---|
| DE | 202007017894 U1 | 3/2008 | | |
| DE | 102007031429 A1 | 1/2009 | | |
| DE | 102014224500 A1 | 6/2016 | | |
| DE | 102015008274 A1 | 12/2016 | | |
| DE | 102018202258 A1 | 8/2019 | | |
| DE | 202019106012 U1 | 1/2020 | | |
| EP | 0992726 A1 | 4/2000 | | |
| EP | 3121485 A1 | 1/2017 | | |
| EP | 3142244 A1 | 3/2017 | | |
| EP | 3483454 A1 | 5/2019 | | |
| WO | 20040097227 A1 | 11/2004 | | |
| WO | 20090005358 A1 | 1/2009 | | |
| WO | WO-2015030143 A1 * | 3/2015 | .............. | E02F 9/123 |
| WO | WO-2019072728 A1 * | 4/2019 | | |

* cited by examiner

HYDRAULIC VALVE MODULE FOR SAFE DEACTIVATION IN THE CASE OF FAILURE OF AN EXTERNAL CURRENT SUPPLY, AND METHOD FOR OPERATING A HYDRAULIC VALVE

The present invention relates to the reliable and economical operation of hydraulic valves even under harsh operating conditions. Hydraulic valves are used, among other things, in construction machinery, agricultural vehicles and in mining. In such applications in particular, it is important that the hydraulic valves are very robust against external influences, in particular also vibrations, and that a reliable setting of desired valve positions is possible in all operating situations.

Typical hydraulic valves for the above applications have a valve slide that is moved by a motor, also called an actuator. In this way, the valve slide can be moved into different positions, allowing hydraulic lines to be (partially) opened or closed as required. Such actuators and hydraulic valves are described, for example, in EP 3 121 485 A1 or US 2008/0121830 A1. According to the prior art, it is common for the valve slide to be brought into or held in a rest position by means of at least one return spring when the drive is not active. This is described, for example, in EP 3 483 454 A1. This ensures reliable deactivation of such a hydraulic valve, in particular even in the event of a current supply failure. If the hydraulic valve is suitably integrated into the actuator of a controlled motion element (excavator bucket, fork of a tractor, etc.), reliable operation of the controlled motion element can also be ensured by reliable deactivation of the hydraulic valve.

However, the return spring described also has disadvantages. On the one hand, it is an additional component which increases the cost of the valve and requires additional installation space, which is particularly unfavorable for some applications. In addition, the actuator must not only be designed to move the valve stem against usual friction, but also to overcome the spring force of the return spring. This requires a correspondingly powerful motor, which can lead to corresponding overall energy losses during operation. In principle, the entire drive of the valve stem, including any gearing systems, must also be designed so that the return spring can move the motor.

Based thereon, the present invention is intended to provide a hydraulic valve module and a method for the reliable operation of a hydraulic valve which do not require a return spring and thereby avoid some of the disadvantages described, without detriment to safety.

A hydraulic valve module as disclosed herein and the described method serve to achieve these objects. Advantageous embodiments and/or further developments, to which, however, the invention is not limited, are indicated herein. Also, the invention comprises a computer program product comprising instructions for causing the described hydraulic valve module to perform the described methods.

A hydraulic valve module according to the invention has at least one hydraulic valve with a valve slide, wherein the valve slide can be adjusted by way of an electric actuator in order to supply hydraulic lines with hydraulic fluid by way of the hydraulic valve, wherein the hydraulic valve module has a controller and an electric energy store, wherein the controller and the electric energy store are set up to move the valve slide out of any possible valve slide position into a deactivation position by way of the electric actuator and energy which is stored in the electric energy store.

A hydraulic valve module comprises at least one and optionally a plurality of hydraulic valves, which are arranged in a row one behind the other in a valve block. The hydraulic valve module preferably further comprises, for each hydraulic valve, a separately actuatable electric actuator, by way of which the corresponding hydraulic valve or the hydraulic lines of the corresponding hydraulic valve can be supplied with hydraulic fluid selectively (in accordance with the requirements of a superordinate controller) (that is to say can be opened, closed, or partially opened and/or closed selectively).

In particular, the hydraulic valve module also comprises the electric actuator controller and the electric energy store, which are described in detail below. The electric energy store and the controller form constituent parts of the hydraulic valve module and as such are preferably arranged directly on the further components of the hydraulic valve module (on the at least one hydraulic valve, on the electric actuator, etc.) and are preferably also connected to these further components. The controller and the electric energy store can, for example, be arranged with the electric actuator and/or the hydraulic valve in a common housing and/or in a housing which is attached (for example screwed) to the electric actuator and/or the hydraulic valve.

Oils in particular are used as the hydraulic fluid in such hydraulic valves.

Hydraulic lines are typically embodied as channels within a valve block of the hydraulic valve. The valve slide is arranged within a channel in the valve block and the valve slide preferably has fluid control structures that interact with hydraulic lines in such a way that, depending on the position of the valve slide, the hydraulic lines are selectively supplied with hydraulic fluid. That is to say, hydraulic lines are either opened or closed (or, if necessary, partially opened or closed).

The valve slide is usually a slide that is displaceable along an axis, and the terms "valve slide position" and "deactivation position" mean, respectively, positions of the valve slide along the axis, wherein the term "valve slide position" here means any position, while the term "deactivation position" here describes a very specific (fixed) defined position. The expression "any possible valve slide position" means any possible position that the valve slide can assume in a range of movement between maximum deflected positions of the valve slide. The deactivation position is preferably located centrally within the range of movement or at a distance from maximum deflected positions of the valve slide, so that the valve slide can be moved in both directions starting from the deactivation position in order to be able to quickly restart the hydraulic valve after a deactivation.

The electric actuator comprises in particular a stepper motor with which the position of the valve slide can be adjusted in order to supply hydraulic lines with hydraulic fluid by way of the hydraulic valve.

However, the electric actuator can also include other types of electric drive motors. In principle, brushless motors (BLC motors; BLC=brushless contact) are particularly suitable for the electric actuator, including stepper motors. However, other types of electric drive motors can also be used in the electric actuator. In principle, however, it is also advantageous if an electric drive motor with which certain positions of a moving element of the motor can be adjusted by energizing the motor is used in the electric actuator. Particularly preferred are motors in which this adjustability of the position is also possible without additional position sensors and position control. This applies in particular to the stepper motors mentioned.

Preferably, the electric drive motor of the actuator is a rotary motor with a stator and a rotor, wherein the rotor actuates the valve slide via a gearing. In preferred embodiments, the gearing comprises a toothed rack for converting a rotation of the drive motor into a linear movement of the valve slide.

In other variants, the electric drive motor can also be a linear motor that directly generates a linear movement, which is particularly preferably transmitted to the valve slide by way of a rigid connection.

The controller is in particular a control device in which a program is stored, according to which the movement of the valve slide can be executed from any possible valve slide position into the deactivation position. This program is preferably permanently stored in a data memory of the controller.

It is particularly preferred if the controller is embodied as an emergency controller and the electric energy store is embodied as an emergency current supply and is set up to provide electrical energy for at least one emergency deactivation when a fault is detected in an external current supply of the hydraulic valve module, wherein the emergency deactivation is set up to bring the valve slide out of every possible valve slide position into the deactivation position.

The electric energy store comprises at least one electric energy storage cell in which the actual storage of electrical energy takes place. In addition, the electric energy store can comprise further components. These are preferably components that control the input of electrical energy to the electric energy store and/or the output of electrical energy from the electric energy store. For example, a charge control device for controlling the charging and discharging of the electric energy storage cell can be another component of the electric energy store.

It is particularly advantageous if no mechanical return spring, by way of which the valve slide can be brought passively into a deactivation position, is arranged in the at least one hydraulic valve module.

Thus, particularly preferably, there is no spring-driven movement of the valve slide in the event that a current supply to the hydraulic valve module fails.

In particular, this can mean that the actuator is designed to be smaller or weaker than in similar valves that do have return springs (which also means that the actuator consumes less energy for the same switching operations). This can also mean that self-locking gearings, for example worm gearings, can be used in the actuators/motors of the hydraulic valves.

The controller or emergency controller and the energy store or emergency current supply are in particular set up to perform an emergency deactivation without the support of a return spring.

The deactivation position of the valve slide is in particular a position in which all hydraulic lines are closed by the hydraulic valve. An emergency deactivation occurs in particular if a fault is detected in an external current supply of the hydraulic valve module. An external current supply is understood here to mean all component parts, including electrical lines for supplying the hydraulic valve with electrical energy, which are located outside the hydraulic valve module. A failure can therefore occur due to defective components or lines. Lines and their connections outside the hydraulic valve module are especially at risk in everyday operation. Whereas in the prior art at least one return spring ensured that the valve was brought into a reliable deactivation position in the event of a power failure, in accordance with the invention the actuator or motor is used for this purpose, which, however, requires a certain minimum energy that is now constantly held in readiness by the electric energy store. The controller uses this energy to carry out the desired deactivation process by means of the actuator. Due to the friction that is always present, which can also be increased by suitable damping means if necessary, the valve then remains in this reliable state, even in the case of vibrations that are normal in operation. In order to exclude interference between the electric energy store, the controller, and the actuator as far as possible, these component parts are arranged spatially very close to each other. This is also expressed by the term "hydraulic valve module", which describes a compact integrated design of a group of hydraulic valves, associated actuators, and the other components provided (controller, electric energy store, etc.). Such a design is also referred to here as a modular design. The module is preferably integrated into a larger machine (tractor, excavator, etc.) in one piece so that the module can be replaced, and, if possible, is also accommodated in a common protective housing, as already explained above.

In addition, the deactivation position is preferably also a calibration position, which is actuated or can be actuated with the valve slide for calibration. During the operation of such hydraulic valves, it can happen that a calibration is lost due to slippage in the actuator/motor and the current position of the valve slide is not exactly known in a controller. This is especially true if a stepper motor is used in the actuator/motor, where a loss of step may also occur. In such a situation where the calibration has been lost, the valve slide can then be brought selectively into the calibration position so that the position of the valve slide is subsequently known again in the controller.

Preferably, according to the invention, the valve slide has a position marker enabling the deactivation position to be found and/or the position of the valve slide to be calibrated. In the case of valve slides with a return spring, such a position marker is not present and also only of limited advantage because the return spring present is used to bring the valve slide (passively) back into a deactivation position if a current position of the valve slide cannot be correctly identified. Without a return spring and such a procedure, it may be advantageous to use a different method or different means to detect the deactivation position. It has been found that a position marker on the valve slide is very advantageous for this purpose. The position marker can be used to detect the presence of the deactivation position of the valve slide. In preferred variants, the position marker can be detected with the controller and the actuator based on an anomaly in the displacement-force relationship or the force curve of the movement of the valve slide. Position markers are possible that are detected or sensed with appropriate (additional) sensors and/or switches. Magnetic, capacitive, or optical sensors can be used.

It is particularly advantageous if a mechanical position marker, especially in the form of a groove (on the valve slide), is provided. By means of a latching spring which latches into the groove in the deactivation position, a mechanical resistance can then be created which can be determined at the actuator or by the controller, so that only the energy consumption or the electrical current required for movement at the actuator has to be observed to determine the deactivation position. If the deactivation position is also a calibration position, a very similar method of calibration can be used as previously used with a return spring on the valve slide. If the groove for the latching spring leaves a small amount of play (and if necessary there are also sloping flanks of the groove or latching spring), the center of the position marker can be determined by moving the valve slide back and forth until a defined increase in force is reached.

The position marker can also be used for a switch-on procedure of the hydraulic valve module. Preferably, a maximum deflected position to the right (or away from the actuator) and to the left (or towards the actuator) starting from the position marker or starting from the calibration position is approached during each switch-on procedure. A maximally deflected position can also be detected on the basis of a characteristic property of the displacement-force relationship or the force curve of the movement of the valve slide, wherein this detection preferably also takes place with the actuator and the controller. An increase in the force or current required to move the actuator usually increases outwardly (right/left). A threshold value for this force or current can define the outward position. The switch-on procedure can be stored in the controller. Preferably, the controller is set up to report proper operation of the hydraulic valve module when the switch-on procedure has been run through as expected for all hydraulic valves of the hydraulic valve module.

In a preferred embodiment of the invention, a plurality of hydraulic valves and a common electric energy store belong to a hydraulic valve module, wherein the electric energy store is designed to bring a plurality of valve slides out of every possible valve slide position into the deactivation position.

Preferably, the electric energy store is designed in such a way that the valve slides of each hydraulic valve in the hydraulic valve module can be brought from any position into the (corresponding intended) deactivation position. This means that even if all valve slides are in a position from which the energy required to bring the valve slides back into the deactivation position is at a maximum, the energy available in the electric energy store is still sufficient to bring all valve slides of the hydraulic valve module back into the deactivation position.

It is particularly advantageous if the actuators of the various hydraulic valves and the electric energy store are connected to the external current supply via an inrush current limiter so that they can be switched on one after the other.

In previously known valve blocks with a plurality of hydraulic valves and their actuators, very high currents are required when switching on, because all actuators are started up at the same time. Such currents do not occur later during operation. The inrush current limiter is preferably set up to modify actuation commands to the actuators of the hydraulic valves in such a way that they are executed offset from each other in such a way that summed inrush currents of the actuators of the hydraulic valves of the hydraulic valve module are limited below a (predetermined or predeterminable) limit value. In the case of an inrush current limiter for a plurality of actuators, for example, the actuators can be switched on one after the other, which delays the entire inrush process only insignificantly, but limits the current to the inrush current of only one actuator plus the regular operating currents of the other actuators even during the switching-on process. In particular, the inrush current limiter described here can also be referred to as an inrush delayer or an inrush delay device. Due to the inrush current limiter, further electrical installations for supplying the hydraulic valve module with electrical power can be designed to be considerably smaller.

In one embodiment according to the invention, the electric energy store comprises at least one electric energy storage cell chargeable by the external current supply.

This chargeable electric energy storage cell is charged immediately after the start of operation of the hydraulic valve module with functioning external current supply, so that it is practically always available in the charged state during operation after a very short start-up phase in order to bring the valve slides into the intended deactivation position or to perform the emergency deactivation. The chargeable electric energy storage cell can also be designed to be sufficiently large for a plurality of corresponding valve slide movements (emergency deactivations) so that it is immediately available again when operation is resumed, even after a plurality of corresponding valve slide movements (emergency deactivations).

In essence, it depends on economic and technical considerations as to which type of electric energy storage cell is used. The aim, of course, is not to lose the cost advantages achieved by omitting a return spring by using a costly electric energy storage cell. One preferred option is for the electric energy storage cell to comprise at least one capacitor and/or one accumulator.

However, a (non-rechargeable) battery can also be used as an alternative if cost/benefit considerations show that this is more favorable for a particular application. This will be the case particularly if corresponding valve slide movements/emergency deactivations occur very rarely and battery replacement at certain time intervals (for example during maintenance work) is acceptable.

In a particular embodiment of the invention, in the hydraulic valve module, the controller and the electric energy store are arranged in a pilot control unit and/or the controller and the electric energy store are part of the pilot control unit. Here, the pilot control unit is in particular a pilot control unit of the at least one electric actuator. The external current supply of the hydraulic valve module is connected to the pilot control unit, or the actuators are connected to the external current supply of the hydraulic valve module via the pilot control unit. This pilot control unit, which may also contain other components, always supplies the actuator with the necessary power and control commands. In undisturbed operation, it is effectively a passive device that passes through power and control commands, but in the event of faults in the external current supply, it becomes an active device and supplies power and control commands for an emergency deactivation.

The inrush current limiter already described above is preferably also part of this pilot control unit and this is thus also connected between the actuators and the external current supply.

The pilot control unit described here is in particular a (common) pilot control unit for all hydraulic valves in the hydraulic valve module. The components described (controller, electric energy store, etc.) are, as explained, preferably present centrally in the hydraulic valve module for a plurality of (preferably for all) hydraulic valves of the hydraulic valve module. However, variants are also possible in which these components (possibly also in the form of a pilot control unit) are present individually for each hydraulic valve. If necessary, these components can each be arranged within the actuator of the corresponding hydraulic valve.

In particular, the pilot control unit can have a protection circuit and/or further (other) common components for a plurality of hydraulic valves, so that these do not have to be present individually for each actuator. For example, one controller in the pilot control unit can perform functions for a plurality of valves, such as checking the integrity of the relevant signal transmission, limiting the inrush current, detecting the failure of the external current supply, and initiating emergency deactivations.

Preferably, the pilot control unit comprises at least one sensor by way of which the external current supply can be monitored, wherein the controller in the pilot control unit is set up to perform an emergency deactivation if a fault in the external current supply is detected by way of the sensor. A fault may be, for example, the failure, excessive fluctuation, or even overvoltage of the external current supply. The type of external current supply can be selected and configured independently of the invention.

If necessary, it is desirable to have to perform an emergency deactivation only in rare cases. Particularly when the emergency current supply or the energy store is under load, an emergency deactivation should only be performed in rare cases. Therefore, in addition, all possibilities to ensure an external current supply when operating in a vehicle can and should be exhausted, which can also mean that the pilot control unit can be connected to both the ignition plus and the steady plus (connection to battery) of the vehicle, so that an emergency deactivation can be performed using the vehicle battery if the sensor detects an unexpected deactivation of the vehicle while actuators are still in the operating position. In this case, the pilot control unit continues to switch through the external current supply from the vehicle battery, but sends signals for emergency deactivation to each actuator.

The use of a pilot control unit for a plurality of hydraulic valves in a hydraulic valve module also makes it possible to loop signal- and current-carrying lines. Particularly preferably, individual hydraulic valves in the hydraulic valve are connected to each other by a series circuit, wherein each hydraulic valve or each actuator of a hydraulic valve is connected to the adjacent hydraulic valves or actuator thereof. Here, hydraulic valves at the beginning of a series connection or at the end of a series connection usually have one adjacent hydraulic valve and hydraulic valves within the series connection have two adjacent hydraulic valves. The pilot control unit is then preferably connected only to a first hydraulic valve and/or to a last hydraulic valve of the series connection. The signals and the current for further hydraulic valves of the series connection are passed through or looped through the connections of the hydraulic valves/actuators with each other up to the hydraulic valve/actuator concerned in each case.

Another advantage of the pilot control unit is that an electrical safety circuit, a current limiter (inrush limiter), reverse polarity protection, voltage conditioning (boost converter) need only be provided in the pilot control unit, and in the individual actuators a much less extensive control electronics can be provided. If necessary, the use of such a pilot control unit can even completely eliminate the need for control electronics for the individual actuators and the electric drive motors arranged therein.

The invention also relates to a method for the reliable operation of a hydraulic valve without a mechanical return spring, wherein a valve slide in the hydraulic valve is moved (preferably exclusively) by an electric valve drive and held in predeterminable positions, wherein, furthermore, when a fault is detected in an external current supply, the current supply is automatically switched over to an electric energy store and the valve slide is moved into a reliable, predeterminable deactivation position.

The described method is preferably carried out with a hydraulic valve module described above, wherein the essential method steps (detection of the fault and automatic switchover from the external current supply to the electric energy store) are carried out in the controller of the hydraulic valve module.

With the method described, inherent safety can be ensured even without a return spring. It is even possible, depending on the state of the valve, to specify different positions as deactivation positions when a malfunction occurs or to still complete a process.

Preferably, the electric energy store is charged by the external current supply during buffer operation and kept ready for emergency deactivation during normal operation of the hydraulic valve.

In a preferred embodiment of the method, the deactivation position or a calibration of the position of the valve slide is determined by means of a position marker on the valve slide, in particular by means of a groove into which a spring engages, so that the resulting force curve can be measured from the actuator. The spring is preferably arranged in a stationary manner on the actuator or a housing of the actuator. When the valve slide is displaced, an interaction occurs between the position marker and the spring, which brings about the force curve described. The position marker is preferably detected by the actuator on the basis of an anomaly in the force curve.

The position marker is also particularly useful for calibration when the actuator detects a so-called step loss during a movement. This process is described, for example, in EP 3 142 244 A1. If a return spring is present, the deactivation position can be easily reached in the event of a step loss by deactivating the actuator, and the deactivation position is automatically set by the acting spring force. In the variant described here, the position marker makes calibration possible. When a step loss has been determined, the deactivation position can be approached selectively for calibration and detected on the basis of the position marker.

As will be further explained with reference to the drawing, the hydraulic valve module generally includes a microprocessor that evaluates signals from the sensor, controls buffer operation, forwards control signals, or generates signals itself in the event of an emergency deactivation. Therefore, the invention also comprises a computer program product which includes instructions for causing the described hydraulic valve module to perform the described methods.

Figure 4A:
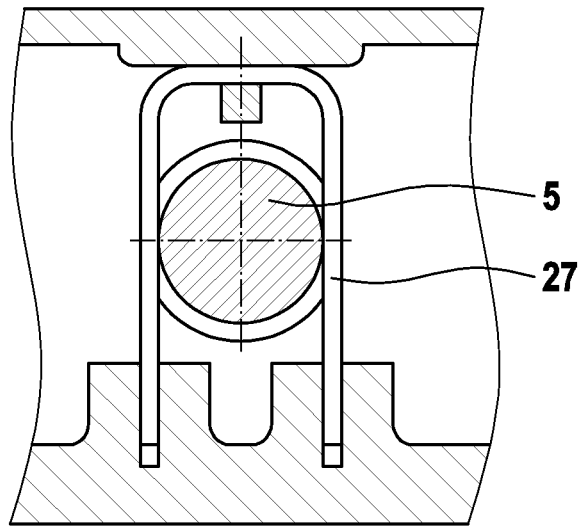
Figure 4B:
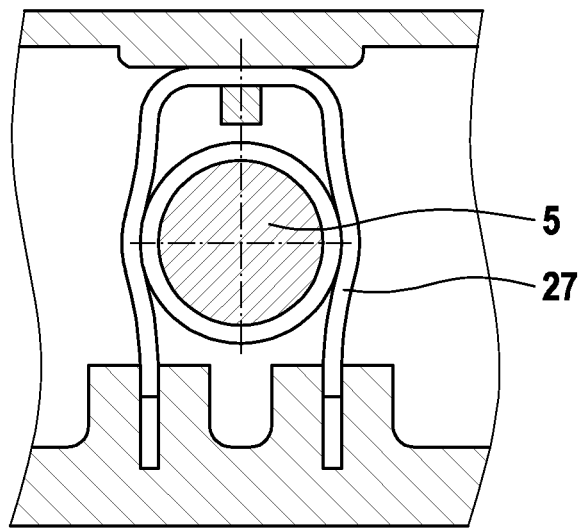
Figure 4C:
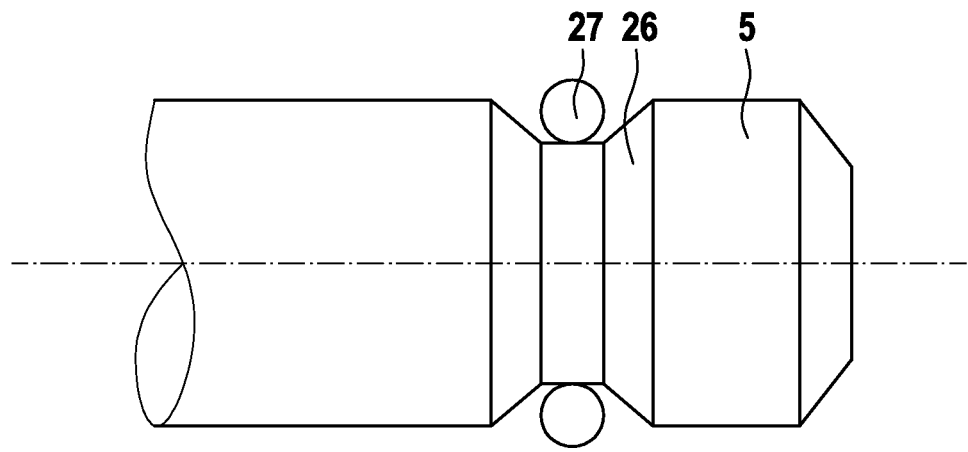
Figure 5A:
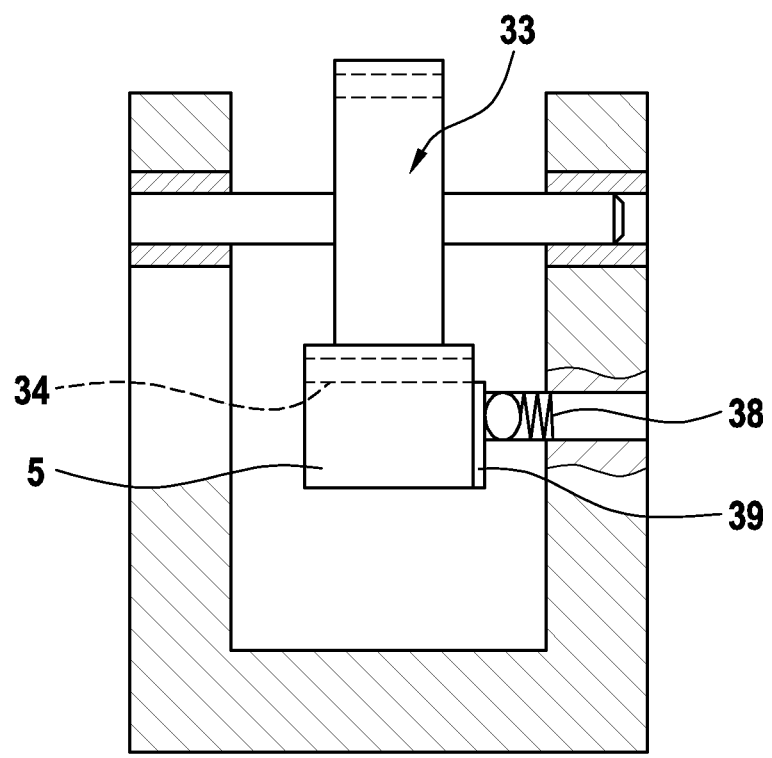
Figure 5B:
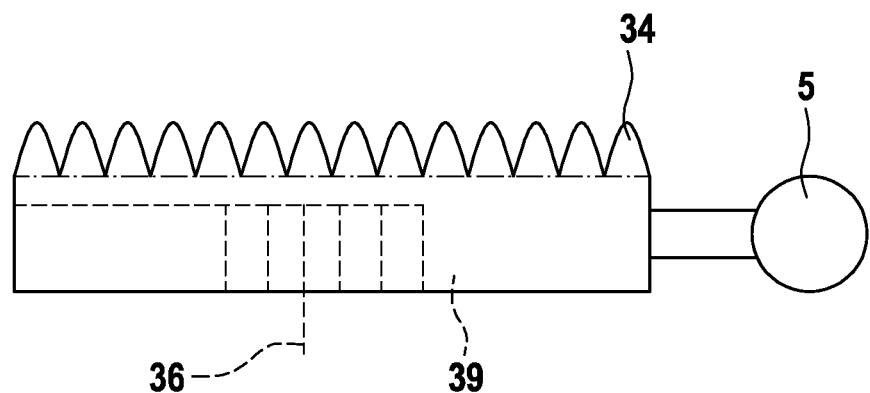
Figure 5C:
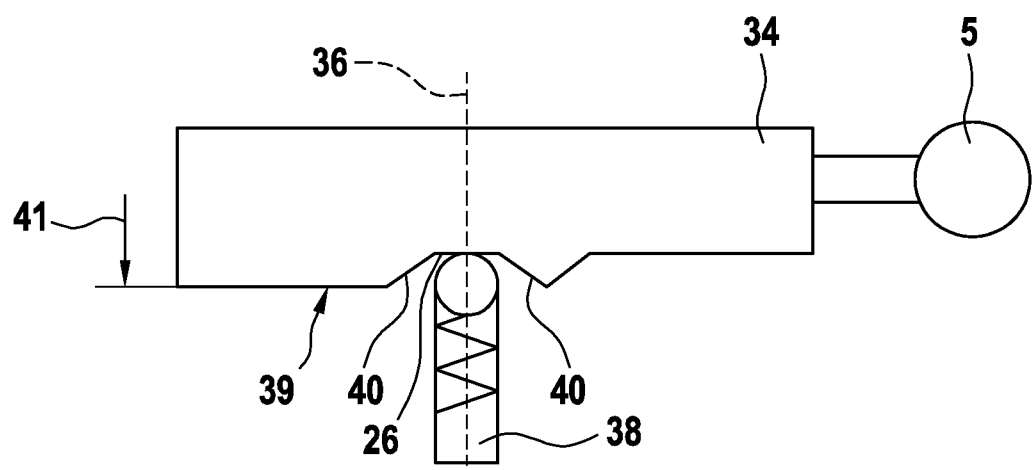

An exemplary embodiment of the invention, to which, however, the invention is not limited, is explained in more detail below with reference to the figures. It should be noted that the figures are only schematic, and are intended to explain the principles of the invention discussed herein. Individual features or functions of the exemplary embodiment described may also be usefully combined with one another within the scope of the invention in ways other than those presented. In the figures FIG. 1a shows a schematic cross-section through a single hydraulic valve of a hydraulic valve module with the valve slide in a deflected position, FIG. 1b shows a schematic cross-section through a single hydraulic valve of a hydraulic valve module with the valve slide in the deactivation position, FIG. 2 shows schematically a hydraulic valve module according to the invention with its connections, FIG. 3 shows schematically a pilot control unit according to the invention with its components and connections, FIG. 4a shows schematically a first representation of a valve slide with position marker and latching element, FIG. 4b shows schematically a second representation of a valve slide with position marker and latching element, FIG. 4c shows schematically a third representation of a valve slide with position marker and latching element, FIG. 5a shows schematically a first illustration of a valve slide with a further type of position marker, FIG. 5b shows schematically a second representation of a valve slide with a further type of position marker, and FIG. 5c shows schematically a third representation of a valve slide with a further type of position marker.

Figure 1B:
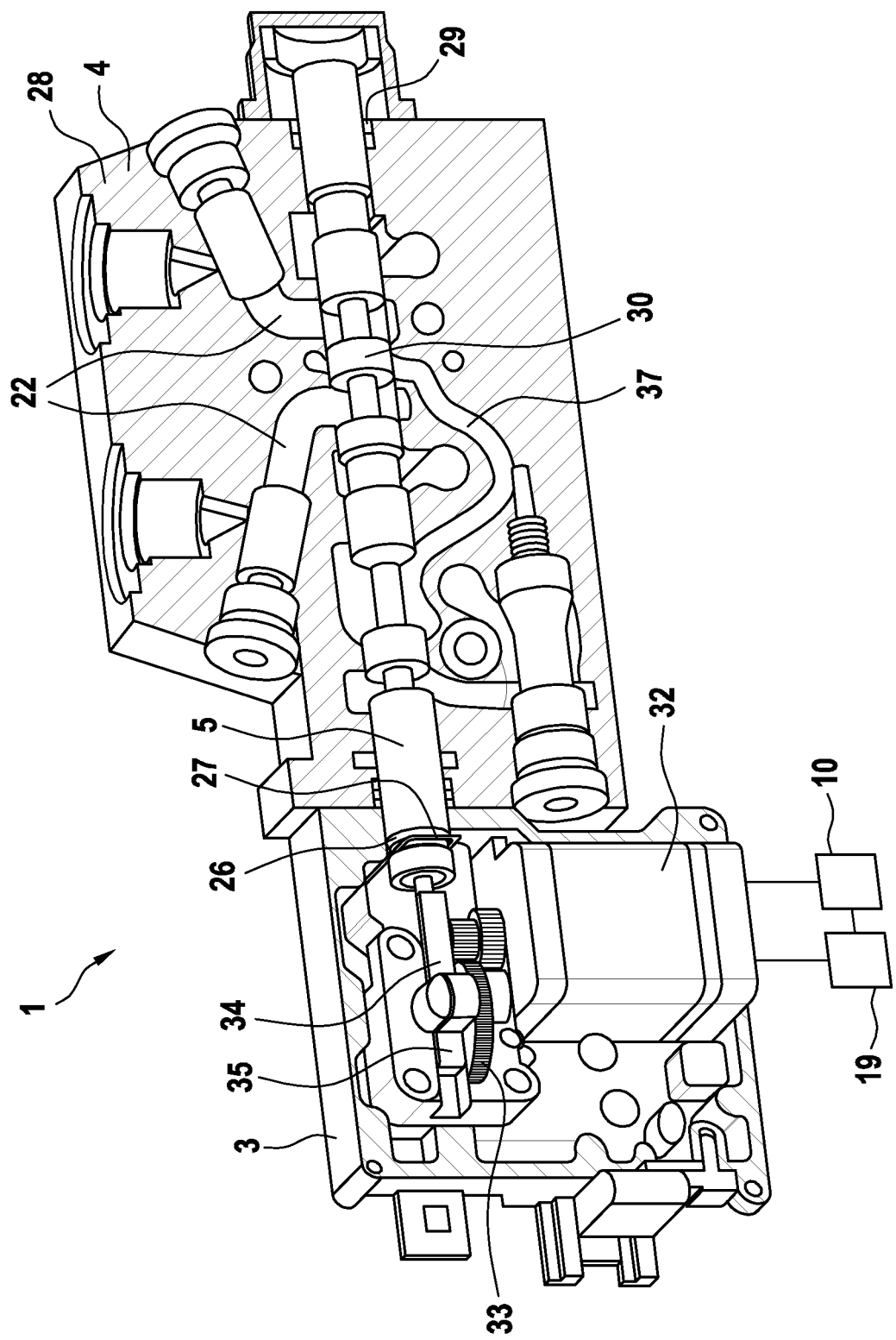

FIG. 1a and FIG. 1b schematically show a cross-section through a hydraulic valve 4 with the actuator 3, wherein this hydraulic valve 4 is a constituent part of the hydraulic valve module 1 described here. FIGS. 1a and 1b show a cross-section through such a hydraulic valve module 1, which passes through one of the hydraulic valves 4. The hydraulic valve 4 has a valve block 28, which valve block 28 may also be a common block in which a plurality of hydraulic valves 4 are arranged (one after the other). The hydraulic valve 4 in each case comprises hydraulic lines 22, which may for example be embodied as bores in the valve block 28. A controller bore 29, in which a valve slide 5 is arranged, is also provided in the valve block 28. Control structures 30 exist on the valve slide 5 and, depending on the position 31 of the valve slide, interact differently with the hydraulic lines 22 and can selectively supply them with hydraulic fluid or selectively open, close and/or partially open and/or partially close them. The position 31 of the valve slide 5 can be adjusted by the motor/actuator 3. In usual variants, the motor/actuator 3 is embodied with an electric motor 32 and a gearing 33, via which the electric motor 32 drives a gearwheel 35, which acts on a rack 34 connected to the valve slide 5. In the sectional view according to FIGS. 1a and 1b, the gearwheel 35 is arranged behind the toothed rack 34 and is concealed by the toothed rack 34. The rack 34 can then be used to set the current position 31 of the valve slide 5 with the motor/actuator 3. FIG. 1a shows an example of a position 31 of the valve slide in which one of the hydraulic lines 22 in the valve block 28 is connected to a supply line 37 in order to supply this hydraulic line 22 with hydraulic oil. Preferably, the valve slide 5 has a provided deactivation position 36, which is particularly preferably realized by a position marker 26 on the valve slide 5. In particular, the position marker 26 is designed to interact with a spring 27 when the valve slide is in the deactivation position. This situation is shown in FIG. 1b. Such a position marker 26 will be explained in greater detail below with reference to FIGS. 4a to 4c and FIGS. 5a to 5c. Also shown schematically in FIG. 1 are the electric energy store 10 and the controller 19. Electrical energy is stored in the electric energy store 10 and is sufficient to bring the valve slide 5 out of any possible valve slide position into the deactivation position (FIG. 1b). The execution of such a deactivation (if necessary also emergency deactivation) is controlled by the controller 19.

Figure 2:
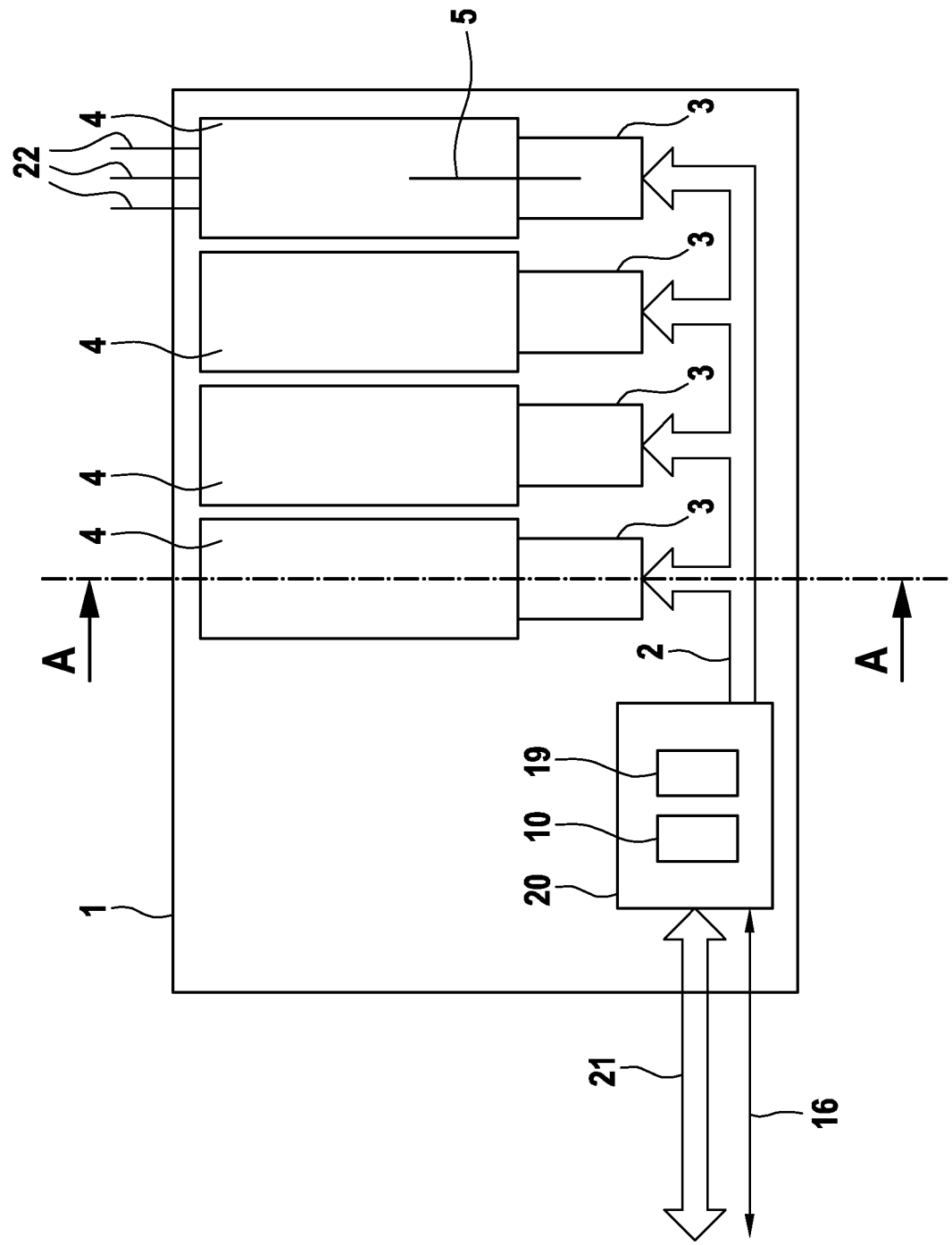

FIG. 2 shows a hydraulic valve module 1 according to the invention with, in this example, four hydraulic valves 4, each of which is assigned an actuator 3 which is set up to move the valve slide, not shown here, of the corresponding hydraulic valve 4. The actuators 3 are connected via electrical lines 2 to a pilot control unit 20, which supplies them with power and control signals. The pilot control unit 20 is supplied with power during normal operation via an external current supply 21. The controller 19 and the electric energy store 10 are arranged here in the pilot control unit 20. A data supply line 16 provides signals for controlling the valves 4, which in turn supply hydraulic fluid to hydraulic lines 22 accordingly. For orientation, the sectional direction A-A is shown in FIG. 2. The illustration of FIGS. 1a and 1b shows such a section through the hydraulic valve module 1.

Figure 3:
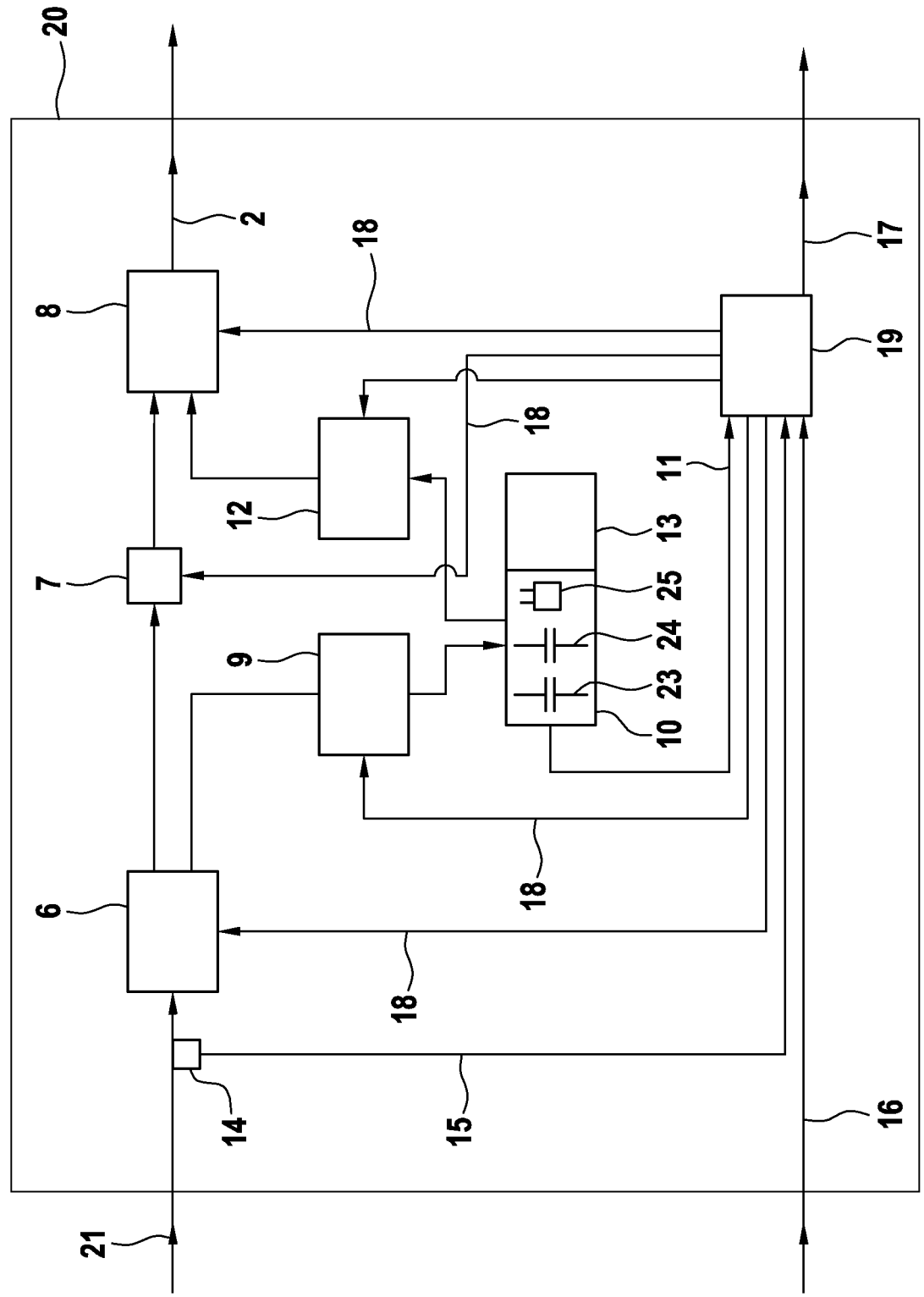

FIG. 3 shows schematically and with further details the structure of a described pilot control unit 20 (as already shown in FIG. 2) with its different components. On the input side, the pilot control unit 20 is connected to an external current supply 21 and data lines 16 for supplying and controlling actuators 3. On the output side, an actuator power line 2 and a data forwarding line 17 extend from the pilot control unit 20. When the pilot control unit 20 is operating passively, power and signals are simply passed through. However, a sensor 14 monitors the integrity of the external current supply 21 and forwards its measurement signals to the controller 19 via a sensor line 15. During normal operation, the electric energy store 10 is additionally charged by a charging circuit 9 so that the energy store 10 is always fully charged shortly after each start of operation, but is not overcharged. The electric energy store may contain at least one accumulator 24 and/or at least one capacitor 23 as an electric energy store cell. Alternatively, however, as indicated in FIG. 3, a non-rechargeable battery 25 can be used as the energy storage cell with a battery management system 13, wherein the charging circuit 9 is then omitted. A voltage converter 12 is used to maintain a constant voltage in the case of different voltage or charging states of the electric energy store 10. This can be assisted by an inrush current limiter 8, so that excessive inrush currents do not occur. The controller 19 is connected to all components via signal lines 18, so that it can preferably control all processes occurring in the pilot control unit 20.

When the sensor 14 signals to the controller 19 that the external current supply 21 is faulty, the controller 19 switches from external current supply 21 to a current supply by means of the electric energy store 10 by means of a changeover switch 7. All actuators 3 are now supplied with power from the electric energy store 10. At the same time, the controller 19 interrupts the data supply line 16 and sends signals to bring the valve slides into the deactivation position or for an emergency deactivation via the data forwarding line 17. An optional protection circuit 6 prevents interference with this process by the external current supply 21. However, an emergency deactivation can also be triggered, for example, if there are interruptions in the data supply line 16 or elsewhere in a data communication. In that case, however, the electric energy store or the emergency current supply is not required.

When restarting after an emergency deactivation, the electric energy store 10 (if discharged) is quickly recharged so that reliable operation is possible again. The pilot control unit 20 can perform other functions as well, such as periodically checking all data and signal lines and the energy store. Example calculations for typical prior art hydraulic valves and actuators indicate that the energy store should have stored at least approximately 4 Ws [watts×second] for each valve and each emergency deactivation. The capacity of the electric energy store 10 can therefore be calculated according to the number of valves connected and the number of emergency deactivations that can be performed as desired, and of course a premium can be added for safety and to allow for aging of the energy store. Any voltage drop that occurs when the energy store 10 is connected can be compensated for by the voltage converter 12. As a result, an emergency current supply according to the invention should have an energy store 10 of at least 12 Ws, which can be achieved for the desired operating voltage, in particular 12 V [volts], by interconnecting so-called supercapacitors and/or accumulator cells (for example lithium-ion accumulators). The cost and other technical characteristics of these component parts determine the best way to store energy for each particular application.

FIG. 4a to FIG. 4c show a valve slide 5 with a position marker 26 in the form of a groove 26 into which a latching element 27 can latch, wherein the latching element 27 is in the form here of a spring clip. The latching element 27 and the groove 26 are shaped and arranged in such a way that, precisely in the deactivation position, which may be at a different location for each type of valve, the latching element 27 latches into the groove 26, which is noticeable at the actuator 3 because a resistance must be overcome in order to push the latching element 27 out of the groove 26 again. This resistance and its location can be measured, specifically in both directions, so that the exact position can be determined in this way. FIG. 4a shows the situation when the spring 27 engages the position marker 26, which is embodied in the form of a groove 26, when the valve slide 5 is in the deactivation position. FIG. 4b shows the situation when the valve slide 5 is not in the deactivation position. Then, the spring 27 is spread open. FIG. 4c shows the case from FIG. 4a (valve slide 5 in deactivation position), again from a different perspective to clarify the interaction of spring 27 and position marker or groove 26.

It should be noted that the type of position marker 26 shown here is of course only to be understood as being exemplary. It is preferred that the position marker 26 is perceptible to the actuator/motor 3 and can thus be detected by the electronics or the controller of the motor without the need for further sensors for this purpose. This means that the actuator/motor 3 can always be moved to the deactivation position, which is preferably also a calibration position, even for calibration of the hydraulic valve.

FIGS. 5a to 5c show another variant of the position marker. A valve slider 5 with a toothed rack 34 with which the valve slider 5 can be moved can be seen here. FIG. 5a shows the valve slider 5 with the toothed rack 34 in a view together with parts of the actuator and in particular with a gearing 33 of the actuator. In FIGS. 5b and 5c, the valve slider 5 with the toothed rack 34 is shown in a side view (FIG. 5b) and in a plan view (FIG. 5c), respectively. A height profile 39 is provided on the side of the valve slide 5 and is rested against by a spring-loaded switch 38. The switch 38 is pressed against the height profile 39 and, depending on the position of the valve slide 5, a certain position of the switch 38 results from the height profile. The position marker 26 by means of which the deactivation position 36 can be recognized is formed, for example, by two rising flanks 40 and can be recognized by means of these rising flanks 40. Particularly preferably, a profile height 41 is different on both sides of the deactivation position 36, so that, by means of the position of the switch 38, it can be recognized in which direction the valve slider 5 is extended.

The switch 38 is preferably connected to the controller so that the information about the position of the valve slide 5 that can be obtained with the switch 38 can be taken into account.

The present invention permits the reliable operation of hydraulic valves without return springs, wherein such valves and their actuators can be made smaller and more economically than conventional valves that do have return springs.

LIST OF REFERENCE SIGNS 1 hydraulic valve module
2 actuator power line
3 motor, actuator
4 hydraulic valve
5 valve slide
6 protection circuit
7 changeover switch
8 inrush current limiter
9 charging circuit
10 power store, energy store
11 status line
12 voltage converter
13 battery management system
14 sensor
15 sensor line
16 data supply line
17 data forwarding line
18 signal lines
19 controller
20 pilot control unit
21 external current supply
22 hydraulic lines
23 capacitor
24 accumulator
25 battery
26 position marker, groove
27 latching element, latching spring
28 valve block
29 control bore
30 control structures
31 position
32 electric motor
33 gearing
34 toothed rack
35 gearwheel
36 deactivation position
37 supply channel
38 switch
39 height profile
40 rising flank
41 profile height

The invention claimed is:

1. A hydraulic valve module having at least one hydraulic valve with a valve slide,
   wherein the valve slide can be adjusted by way of an electric actuator in order to supply hydraulic lines with hydraulic fluid by way of the hydraulic valve,
   wherein the hydraulic valve module has a controller and an electric energy store,
   wherein the controller and the electric energy store are set up to move the valve slide out of any possible valve slide position into a deactivation position by way of the electric actuator and energy which is stored in the electric energy store,
   wherein the valve slide has a position marker enabling the deactivation position to be found and/or the position of the valve slide to be calibrated, and
   wherein the position marker is a groove into which a latching element can engage.

2. The hydraulic valve module as claimed in claim 1, wherein the controller is configured as an emergency controller and the electric energy store is configured as an emergency current supply and is set up to provide electrical energy for at least one emergency deactivation when a fault is detected in an external current supply of the hydraulic valve module, wherein the emergency deactivation is set up to bring the valve slide out of any possible valve slide position into the deactivation position.

3. The hydraulic valve module as claimed in claim 2, wherein a plurality of hydraulic valves and a common electric energy store belong to the hydraulic valve module and the electric energy store is designed to bring a plurality of valve slides out of any possible valve slide position into the deactivation position.

4. The hydraulic valve module as claimed in claim 2, wherein the actuator of each hydraulic valve of the at least one hydraulic valve and the electric energy store are connected to the external current supply via an inrush current limiter so that the actuator of each hydraulic valve can be switched on one after the other.

5. The hydraulic valve module as claimed in claim 2, wherein the electric energy store comprises at least one electric energy storage cell chargeable by the external current supply.

6. The hydraulic valve module as claimed in claim 5, wherein the at least one electric energy storage cell comprises at least one capacitor and/or accumulator.

7. The hydraulic valve module as claimed in claim 5, wherein the at least one electric energy storage cell comprises a battery.

8. The hydraulic valve module as claimed in claim 2, wherein the controller and the electric energy store are arranged in a pilot control unit of the at least one electric actuator, to which the external current supply of the hydraulic valve module is connected.

9. The hydraulic valve module as claimed in claim 8, wherein the pilot control unit comprises a protection circuit for a plurality of hydraulic valves.

10. The hydraulic valve module as claimed in claim 8, wherein the pilot control unit comprises at least one sensor by way of which the external current supply can be monitored, and the controller in the pilot control unit is set up to perform an emergency deactivation if a fault in the external current supply is detected by way of the sensor.

11. The hydraulic valve module as claimed in claim 1, wherein no mechanical return spring, by way of which the valve slide can be brought passively into a deactivation position, is arranged in the at least one hydraulic valve module.

12. The hydraulic valve module as claimed in claim 1, wherein the deactivation position is located centrally within a range of movement or at a distance from maximum deflected positions of the valve slide.

13. The hydraulic valve module as claimed in claim 1, wherein the deactivation position corresponds to a particular position in which all hydraulic lines are closed by the hydraulic valve.

14. A method for reliable operation of a hydraulic valve module without a mechanical return spring,
wherein a valve slide in a hydraulic valve of the hydraulic valve module is moved by an electric actuator and held in predeterminable positions,
wherein, furthermore, when a fault is detected in an external current supply, the current supply is automatically switched over to an electric energy store of the hydraulic valve module and the valve slide is moved into a reliable, predeterminable deactivation position,
wherein the deactivation position is determined by means of a position marker on the valve slide, and
wherein a latching element is configured to engage into a groove of the position marker.

15. A computer program product having a non-transitory computer readable medium which stores instructions for reliable operation of a hydraulic valve module without a mechanical spring, the set of instructions, when carried out by computerized circuitry, causing the computerized circuitry to perform a method in which:
a valve slide in a hydraulic valve of the hydraulic valve module is moved by an electric actuator and held in predeterminable positions, and
when a fault is detected in an external current supply, the current supply is automatically switched over to an electric energy store of the hydraulic valve module and the valve slide is moved into a reliable, predeterminable deactivation position,
wherein the deactivation position is determined by means of a position marker on the valve slide, and
wherein a latching element is configured to engage into a groove of the position marker.

* * * * *